United States Patent Office 3,042,678
Patented July 3, 1962

3,042,678
PREPARATION OF DIPHENYL-PYRIDYL- AND DIPHENYL-QUINOLYL-METHANES
Wilhelm Mathes, Ludwigshafen (Rhine), and Anton Wolf, Heidelberg, Germany, assignors to Dr. F. Raschig G.m.b.H., Ludwigshafen (Rhine), Germany, a limited-liability company of Germany
No Drawing. Filed Apr. 16, 1959, Ser. No. 806,773
5 Claims. (Cl. 260—283)

This invention relates to the preparation of diphenyl-pyridyl- and diphenyl-quinolyl-methanes and more particularly to a process for preparing such methanes by reacting a pyridine- or quinoline-aldehyde with benzene in the presence of a dehydrating agent at a temperature below 100° C.

It is already known to produce triphenylmethane from benzaldehyde and benzene in the presence of aluminum chloride or iron chloride. This reaction, however, produces only a low yield amounting to about 10–30% of theory. The reaction of benzaldehyde or pyridine- or quinoline-aldehyde with phenols, phenol esters or phenol ethers has been heretofore suggested but not condensation in the presence of a dehydrating agent such as sulfuric acid.

It is, therefore, surprising and unexpected that the reaction of pyridine- and quinoline-aldehydes with benzene in the presence of a dehydrating agent such as concentrated sulfuric acid or phosphoric acid would efficiently and in high yield produce the respective diphenyl-pyridyl- and diphenyl-quinolyl-methanes, respectively, particularly since, for example, the sulfate of the aldehyde bases separates but dissolves again in the excess acid, a further fact which could not have been predicted.

According to the present invention, a good yield of all the isomeric diphenyl-pyridyl- and diphenyl-quinolyl-methanes can be obtained in a simple manner and in one operation so that the process is particularly suitable for industrial use. The reaction can be carried out at about room temperature but also at higher temperatures under vigorous stirring, but it has been found that the temperature should not be permitted to exceed 100° C. By the addition of alkali, soda or ammonia, the base is liberated and is absorbed by the solvent. The present process thus differs from and presents important advantages over known multi-stage processes for the preparation of diphenyl-pyridyl-methanes. The diphenyl-quinolyl-methanes are not known and have not been described in literature. It has been further suggested that diphenyl-pyridyl-2-methane can be obtained from diphenyl-bromomethane and pyridine by intensive heating of the diphenyl-methyl-pyridinium-bromide formed, but by this reaction only a few percent of the desired compound is obtained along with several other substances or by-products. (See Tschitschibabin, F. russ. phys. chem. Ges., vol. 34, p. 133, Chem. Zentralblatt, 1902, I, p. 1301.) Diphenyl-pyridyl-2-methane can also be obtained by grignardizing benzoyl pyridine with bromobenzene followed by reduction of the corresponding carbinol by means of hydrogen iodide-glacial acetic acid by prolonged heating (see Tschitschibabin and Benewolenskaja, Ber, vol. 61, p. 547 et seq. (1928)), and also by the action of 2-bromo-pyrdine on diphenyl-acetonitrile in the presence of sodium amide followed by saponification of the cyano-group and then decarboxylation (see Angew. Chemie 66, p. 747 (1954)).

The diphenyl-pyridyl- and diphenyl-quinolyl-methanes prepared according to the present invention are useful as medicaments or as intermediates in the production of medicaments, as e.g. diphenyl-piperidyl-2-methane which has a stimulating effect on the central nervous system and is superior to desoxyephedrine owing to a much quicker beginning of the effect (see Angew. Chemie 66, p. 747 (1954)).

The invention is illustrated by the following non-limitative examples:

Example 1

100 ml. of concentrated sulfuric acid and 50 ml. of benzene are charged into a round-bottom flask and a solution of 53.5 grams of pyridine-2-aldehyde in 100 ml. of benzene is added dropwise under vigorous stirring. The temperature rises to 60-70° C. and the mixture is then heated on a waterbath for 15–20 hours under constant stirring to a temperature of 80° C. After cooling the unreacted benzene is removed, the viscous sulfate layer is poured on ice, and is then neutralized with soda to a pH of 7 and shaken out several times with chloroform. The chloroform is distilled off leaving a viscous, dark colored residue which is then vacuum fractionated at 2 Torr. There was thereby obtained 5 grams of unreacted pyridine-2-aldehyde and as the main fraction diphenyl-pyridyl-2-methane as a viscous, light yellow oil having a boiling point of 174–178° C. The yield is 83 grams which is equal to 74% of theory based upon the reacted pyridine-2-aldehyde.

Example 2

50 grams of pyridine-2-aldehyde dissolved in 100 grams of benzene are gradually mixed under cooling and stirring with 100 ml. of phosphoric acid and the mixture stirred for about 6 hours at room temperature. Excess benzene is separated and the syrup poured into ice water, made alkaline with alkali-carbonate and shaken out with ether or chloroform. After drying and distilling off the solvent, the thick dark residue is vacuum fractionated at 1 Torr. In the first running 32 grams of pyridine-2-aldehyde are recovered and the diphenyl-pyridyl-2-methane passes over between 174–181° C. as a yellowish oil which slowly crystallizes in the receiver.

Example 3

100 grams of pyridine-3-aldehyde, 300 ml. of benzene and 200 ml. of concentrated sulfuric acid are reacted in accordance with Example 2 and similarly worked up.

There is obtained 45 grams of pyridine-3-aldehyde and as the main fraction diphenyl-pyridyl-3-methane which passes over at a boiling point of 160–170° C. as a colorless oil which solidifies immediately as crystals in the receiver. The melting point is 74–75° C. The yield is 54 grams which is equal to 43.6% of theory based on the reacted pyridine-3-aldehyde.

Example 4

100 grams of pyridine-4-aldehyde, 300 ml. of benzene and 200 ml. of concentrated sulfuric acid are reacted according to Example 1 and similarly worked up.

As the main fraction there is obtained diphenyl-pyridyl-4-methane as a colorless oil which passes over at a boiling point of 178–184° C. and immediately crystallizes in the receiver. The yield is 134 grams which is equal to 55% of theory. The product can be recrystallized from acetone and then has a melting point of 125° C. The picrate melts at 174° C.

Example 5

In a round-bottom flask are charged 200 ml. of concentrated sulfuric acid and 100 ml. of benzene to which is added dropwise under constant stirring from a dropping funnel a solution of 121 grams of 6-methyl-pyridine-2-aldehyde in 200 ml. of benzene. The contents of the flask are heated for 15–20 minutes on a steam bath at 80° C. and the work-up is carried out according to Example 1.

As the main fraction, there is obtained diphenyl-(6-methyl-pyridyl)-2-methane which passes over as a light yellow, viscous oil having a boiling point of 161–164° C. and which solidifies slowly in the receiver. The melting point is 60–61° C. The yield is 147 grams which is equal to 72.4% of theory based on the reacted 6-methyl-pyridine-2-aldehyde, 26 grams of this aldehyde being recovered.

*Example 6*

27 grams of quinoline-2-aldehyde are dissolved in 100 ml. of benzene and after adding 100 ml. of concentrated sulfuric acid, the mixture is stirred for 15 hours at 40–50° C. The product is prepared in accordance with Example 1.

As the main fraction there is obtained diphenyl-quinolyl-2-methane as a yellow oil with a boiling point of 185–210° C. and which solidifies as crystals in the receiver. The yield is 18.5 grams and when recrystallized from ether, the colorless crystals melt at 81–82° C.

In a similar manner quinolyl-3-aldehyde and the other isomeric quinoline-aldehydes are converted to the respective diphenyl-quinolyl-methanes.

The invention thus produces a simple and efficient procedure for the preparation of all isomeric diphenyl-pyridyl- and diphenyl-quinolyl-methanes in one operation. The procedure has important advantages over prior known procedures. The invention also includes the diphenyl-quinolyl-methanes which have not been previously known.

The invention is defined by the appended claims.

What is claimed is:
1. The process of preparing the isomers of diphenyl-pyridyl- and diphenyl-quinolyl-methanes which comprises reactively contacting an aldehyde selected from the group consisting of the isomeric pyridine- and quinoline-aldehydes with benzene in the presence of an acid dehydrating agent at a temperature below 100° C.
2. The process of claim 1 wherein the dehydrating agent is sulfuric acid.
3. The process of claim 1 wherein the dehydrating agent is phosphoric acid.
4. The process of claim 1 wherein an alkaline material selected from the group consisting of alkali, soda and ammonia is added and the liberated reaction products are then recovered.
5. The process of claim 1 wherein the aldehyde is selected from the group consisting of pyridine-2-aldehyde, pyridine-3-aldehyde and pyridine-4-aldehyde.

References Cited in the file of this patent

Hoffman et al.: Journal of American Chemical Society, vol. 55, (1933), pp. 2000–4.

Walker: Formaldehyde (1953), Second Ed., pages 169–170.

Migrdichian: Organic Synthesis (II), pages 1350–1351 (1957).